United States Patent
Kolan et al.

(10) Patent No.: US 11,431,817 B2
(45) Date of Patent: Aug. 30, 2022

(54) METHOD AND APPARATUS FOR MANAGEMENT OF NETWORK BASED MEDIA PROCESSING FUNCTIONS

(71) Applicant: Samsung Electronics Co., Ltd., Suwon-si (KR)

(72) Inventors: Prakash Kolan, Plano, TX (US); Imed Bouazizi, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/699,028

(22) Filed: Nov. 28, 2019

(65) Prior Publication Data

US 2020/0177694 A1    Jun. 4, 2020

Related U.S. Application Data

(60) Provisional application No. 62/775,202, filed on Dec. 4, 2018.

(51) Int. Cl.
| | |
|---|---|
| *H04L 67/566* | (2022.01) |
| *H04L 67/00* | (2022.01) |
| *H04L 65/65* | (2022.01) |
| *H04L 65/60* | (2022.01) |
| *H04L 67/104* | (2022.01) |

(52) U.S. Cl.
CPC ........ *H04L 67/2833* (2013.01); *H04L 65/605* (2013.01); *H04L 65/608* (2013.01); *H04L 67/1044* (2013.01); *H04L 67/34* (2013.01)

(58) Field of Classification Search
CPC . H04L 67/2833; H04L 67/1044; H04L 67/34; H04L 65/605; H04L 65/608
See application file for complete search history.

(56) References Cited

U.S. PATENT DOCUMENTS

| | | | |
|---|---|---|---|
| 9,152,390 B1* | 10/2015 | Tripakis | G06F 8/34 |
| 9,336,288 B2* | 5/2016 | Mundlapudi | G06F 16/254 |
| 9,753,701 B2* | 9/2017 | Liu | G06F 8/34 |

(Continued)

FOREIGN PATENT DOCUMENTS

| | | |
|---|---|---|
| JP | 2008-217123 A | 9/2008 |
| KR | 10-2019-0033022 A | 3/2019 |
| WO | 2016/178124 A1 | 11/2016 |

OTHER PUBLICATIONS

International Search Report dated Mar. 25, 2020 in connection with International Patent Application No. PCT/KR2019/017011, 3 pages.

(Continued)

*Primary Examiner* — Blake J Rubin

(57) ABSTRACT

An electronic device, non-transitory computer readable medium and a method for management of network based media processing functions is provided. The method includes receiving a list of functions included in a functions repository; building a workflow using functions within the list of functions; determining an output of a first function and an input of a second function that are not compatible; inserting compatibility functions between the first function and the second function; creating a function group with the first function, the compatibility functions, and the second function; replacing each instance where the first function immediately precedes the second function with the function group.

20 Claims, 9 Drawing Sheets

(56) References Cited

U.S. PATENT DOCUMENTS

| | | | |
|---|---|---|---|
| 9,825,769 B2* | 11/2017 | Batz | H04L 67/14 |
| 10,069,719 B2 | 9/2018 | Kolan et al. | |
| 10,470,000 B2 | 11/2019 | Kolan et al. | |
| 10,671,360 B1* | 6/2020 | Todd | G06F 11/3466 |
| 2011/0009991 A1* | 1/2011 | Dinicola | G06Q 30/02 |
| | | | 700/97 |
| 2011/0280398 A1* | 11/2011 | Fradis | H04N 21/8358 |
| | | | 380/201 |
| 2012/0084404 A1* | 4/2012 | Haot | G11B 27/11 |
| | | | 709/219 |
| 2012/0272228 A1* | 10/2012 | Marndi | G06F 9/44536 |
| | | | 717/170 |
| 2013/0066623 A1* | 3/2013 | Chou | H04L 67/2823 |
| | | | 704/2 |
| 2013/0346965 A1 | 12/2013 | Conlan et al. | |
| 2014/0143806 A1* | 5/2014 | Steinberg | G11B 27/034 |
| | | | 725/34 |
| 2014/0244627 A1 | 8/2014 | Bhatia | |
| 2014/0310054 A1* | 10/2014 | Hernandez, Jr | G06Q 10/0633 |
| | | | 705/7.27 |
| 2015/0095024 A1 | 4/2015 | Tsujino | |
| 2016/0232013 A1* | 8/2016 | O'Neill | G06F 9/451 |
| 2016/0344565 A1 | 11/2016 | Batz et al. | |
| 2017/0164062 A1* | 6/2017 | Abramov | H04N 21/235 |
| 2018/0011739 A1* | 1/2018 | Pothula | G06Q 10/0631 |
| 2018/0157825 A1* | 6/2018 | Eksten | H04L 9/3239 |
| 2019/0028691 A1* | 1/2019 | Hinds | H04N 21/4518 |
| 2019/0037252 A1* | 1/2019 | Wagenaar | H04N 21/2668 |
| 2019/0095261 A1* | 3/2019 | Wang | H04L 67/148 |
| 2019/0222621 A1 | 7/2019 | Kolan et al. | |
| 2019/0332667 A1* | 10/2019 | Williams | G06F 40/216 |
| 2019/0364081 A1* | 11/2019 | Valenzuela | H04L 67/40 |
| 2020/0004604 A1* | 1/2020 | Lavoie | G06F 16/907 |
| 2020/0020077 A1* | 1/2020 | You | H04L 65/4069 |
| 2020/0073643 A1* | 3/2020 | Tsirkin | G06F 9/44505 |
| 2020/0092530 A1* | 3/2020 | Wang | H04N 13/349 |
| 2020/0344498 A1* | 10/2020 | Lazar | H04N 21/44 |
| 2021/0258632 A1* | 8/2021 | Hoffmann | H04N 21/6106 |

OTHER PUBLICATIONS

Written Opinion of the International Searching Authority dated Mar. 25, 2020 in connection with International Patent Application No. PCT/KR2019/017011,4 pages.

European Patent Office, "Supplementary European Search Report" dated Dec. 23, 2021, in connection with European Patent Application No. EP19894363.1, 13 pages.

"Information technology—Coded representation of immersive media (MPEG-1)—Part 8: Network Based Media Processing", ISO 23090-8:2018(E), 1S0/IEC JTC1/SC 29/WG 11, Secretariat: XXXX, 2018, 47 pages.

Samsung Electronics Co Ltd., "NBMP API", International Organisation for Standardisation Organisation Internationale de Normalisation, Coding of Moving Pictures and Audio, ISO/IEC JTC1/SC29/WG11 MPEG 2018/ m45013, Oct. 2018, Macau, China, 3 pages.

Nokia, "[NBMP CE Framework] Nokia input", International Organisation for Standardisation Organisation Internationale de Normalisation, Coding of Moving Pictures and Audio, ISO/IEC JTC1/SC29/WG11MPEG2018/M44024, Sep. 2018, Den Haag, Netherlands, 3 pages.

European Patent Office, Communication pursuant to Article 94(3) EPC dated Jul. 11, 2022 regarding Application No. 19894363.1, 9 pages.

* cited by examiner

METHOD AND APPARATUS FOR MANAGEMENT OF NETWORK BASED MEDIA PROCESSING FUNCTIONS

CROSS-REFERENCE TO RELATED APPLICATION AND CLAIM OF PRIORITY

This application claims priority under 35 U.S.C. § 119(e) to U.S. Provisional Patent Application No. 62/775,202 filed on Dec. 4, 2018. The above-identified provisional patent application is hereby incorporated by reference in its entirety.

TECHNICAL FIELD

This disclosure relates generally to media processing. More specifically, this disclosure relates to a management of network based media processing functions.

BACKGROUND

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required. The provider typically provides a list of processing functions/services that are available in the provider's domain that the end user clients can request provisioning as part of the processing workflow in the network. To provide a facility for lookup of supported media processing functions, the provider has to implement a function repository that lists all the supported media processing functions.

SUMMARY

This disclosure provides method and apparatus for management of network based media processing functions.

In one embodiment, an electronic device is provided. The electronic device includes a memory and a processor. The processor receives a list of functions included in a functions repository; builds workflow using functions within the list of functions; determines an output of a first function and an input of a second function that are not compatible; inserts compatibility functions between the first function and the second function; creates a function group with the first function, the compatibility functions, and the second function; replaces each instance where the first function immediately precedes the second function with the function group.

In another embodiment, a method is provided. The method includes method includes receiving a list of functions included in a functions repository; building a workflow using functions within the list of functions; determining an output of a first function and an input of a second function that are not compatible; inserting compatibility functions between the first function and the second function; creating a function group with the first function, the compatibility functions, and the second function; replacing each instance where the first function immediately precedes the second function with the function group.

In another embodiment, a non-transitory computer readable medium embodying a computer program is provided. The computer program includes computer readable program code that, when executed by a processor of an electronic device, causes the processor to receive a list of functions included in a functions repository; build a workflow using functions within the list of functions; determine an output of a first function and an input of a second function that are not compatible; insert compatibility functions between the first function and the second function; create a function group with the first function, the compatibility functions, and the second function; replace each instance where the first function immediately precedes the second function with the function group.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of this disclosure, can include a personal computer (such as a laptop or a desktop), a workstation, a server, a television, an appliance, a virtual assistant, and the like. Additionally, the electronic device can be at least one part of a piece of furniture or building/structure, an electronic board, an electronic signature receiving device, a projector, or a measurement device. In some embodiments, the electronic device can be a portable electronic device like a portable communication device (such as a smartphone or mobile phone), a laptop, a tablet, an electronic book reader (such as an e-reader), a personal digital assistant (PDA), a portable multimedia player (PMP), an MP3 player, a mobile medical device, a virtual reality headset, a portable game console, a camera, or a wearable device, among others. The electronic device can be one or a combination of the above-listed devices. Additionally, the electronic device as disclosed herein is not limited to the above-listed devices and can include new electronic devices depending on the development of technology. It should be noted that, as used here, the term "user" may denote a human or another device (such as an artificial intelligent electronic device) using the electronic device.

Figure 1:
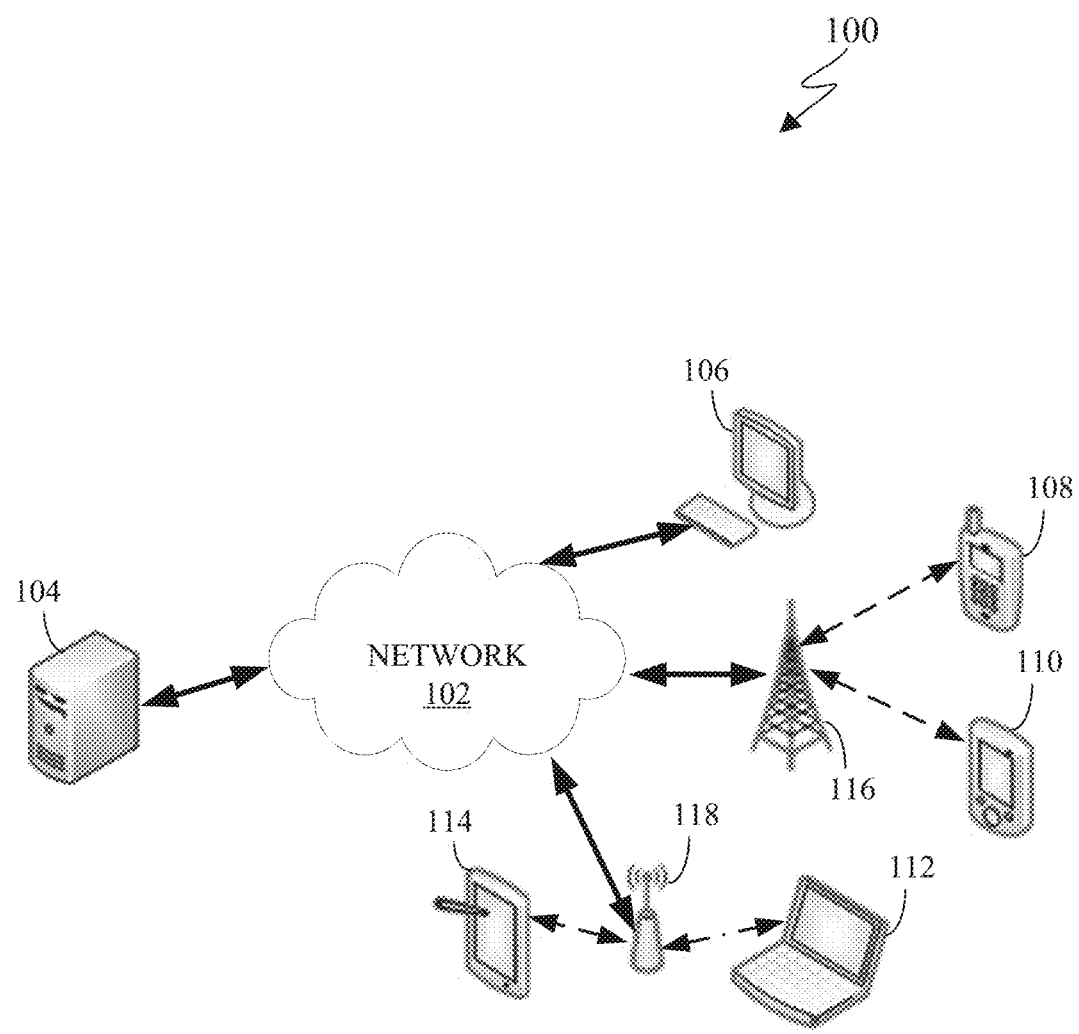
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, the server 104 includes a workflow manager that can select functions and build a workflow pipeline to perform a media processing task. The workflow manager is discussed in greater detail below with respect to FIGS. 4A, 4B, and 5.

Each client device 106-114 represents any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement.

In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
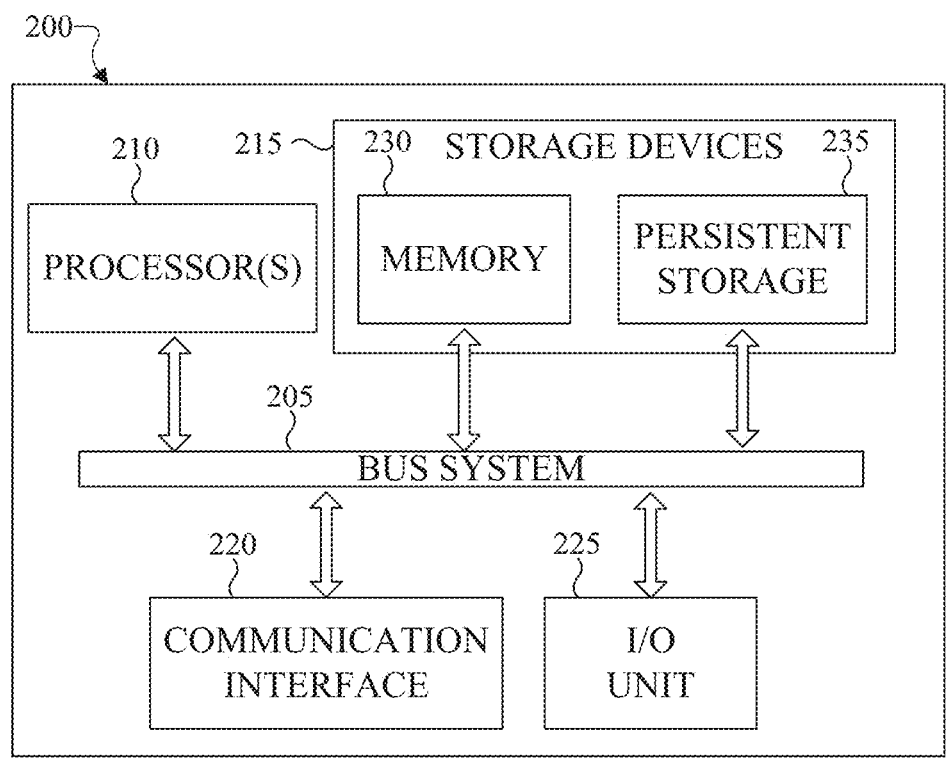
FIGS. 2 and 3 illustrate example electronic devices in accordance with an embodiment of this disclosure.
Figure 3:
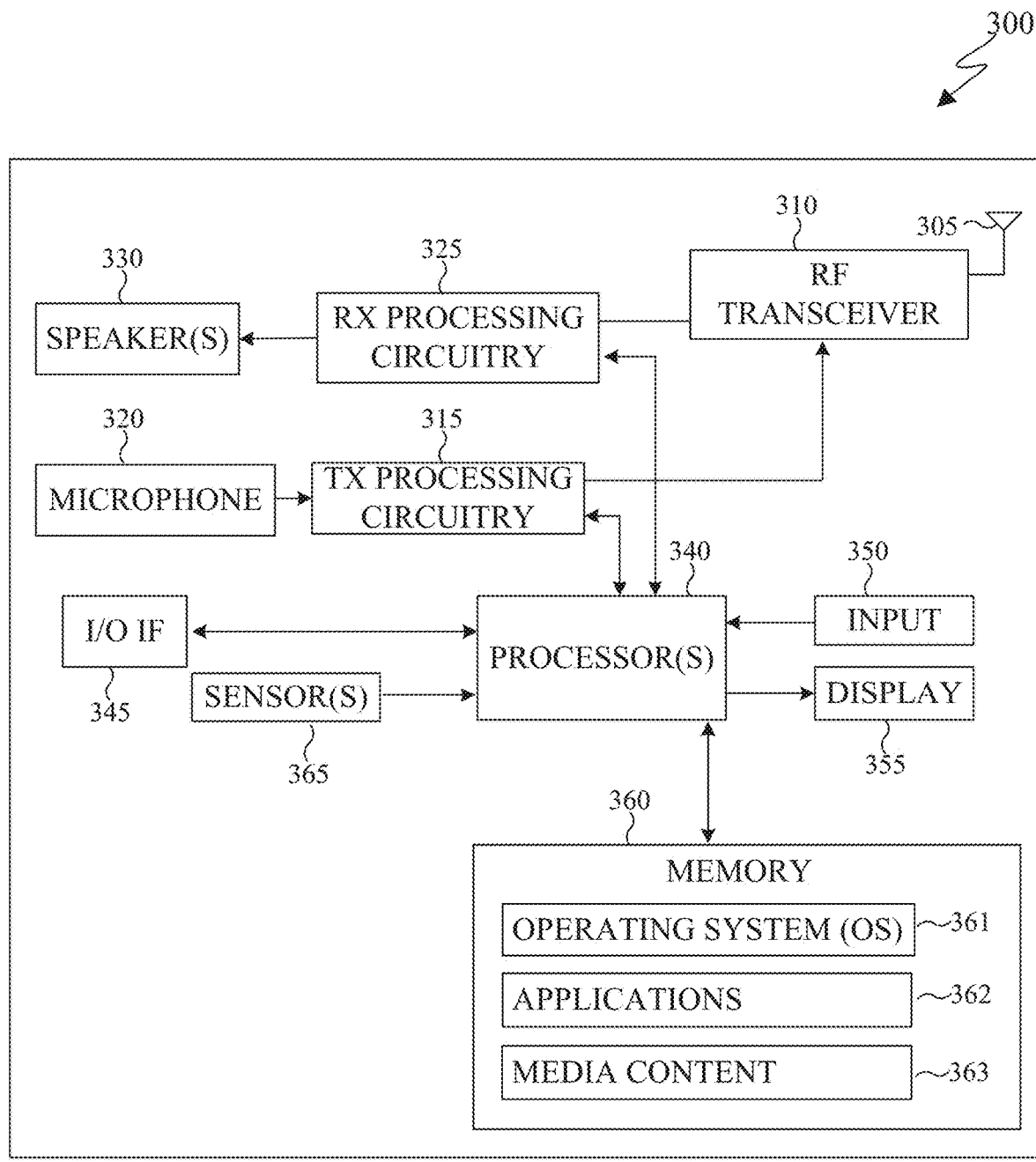

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-114 of FIG. 1.

As shown in FIG. 2, the server 200 includes a bus system 205 that supports communication between at least one processing device 210, at least one storage device 215, at least one communications interface 220, and at least one input/output (I/O) unit 225. The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. For example, in some embodiments, the electronic device 300 may implement or represent a virtual assistant device that can receive a natural language input, derive meaning from the input, and perform an action based on the derived meaning. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361, one or more applications 362, and media content.

The communication unit 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing ASR processing and the like. The processor 340 can move data into or out of the memory 360 as required by an executing process. In some embodiments, the processor 340 is configured to execute a plurality of applications 362 based on the OS 361 or in response to signals received from external source(s) or an operator. Example, applications 362 can include a camera application (for still images and videos), a video phone call application, an email client, a social media client, an SMS messaging client, a virtual assistant, and the like. In some embodiments, the processor 340 is configured to receive and transmit the media content 363. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content 363. The media content 363 can include various types of media such as images, videos, three-dimensional content, VR content, AR content, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
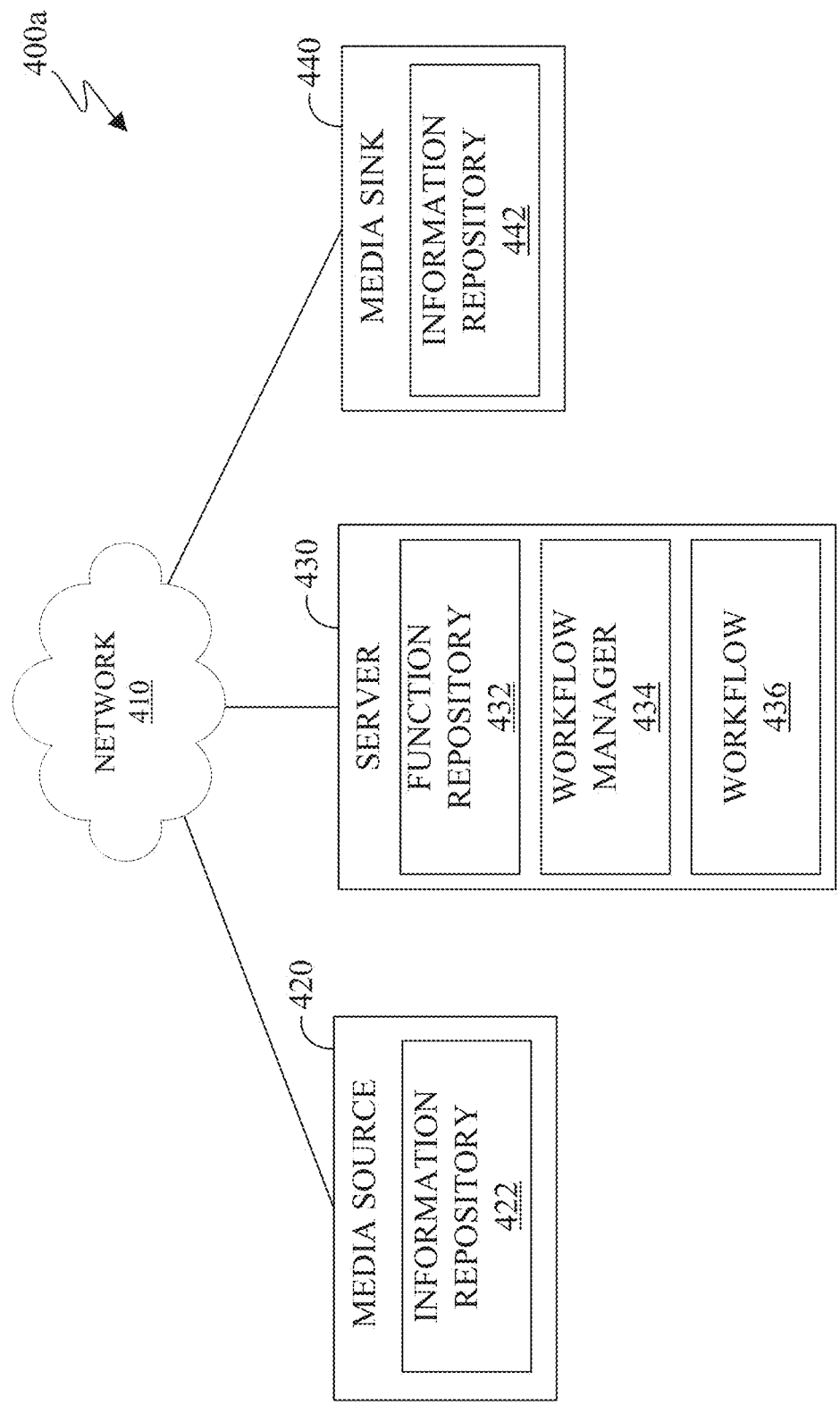
FIG. 4A illustrates a block diagram of an example media processing system in accordance with an embodiment of this disclosure.
Figure 4B:
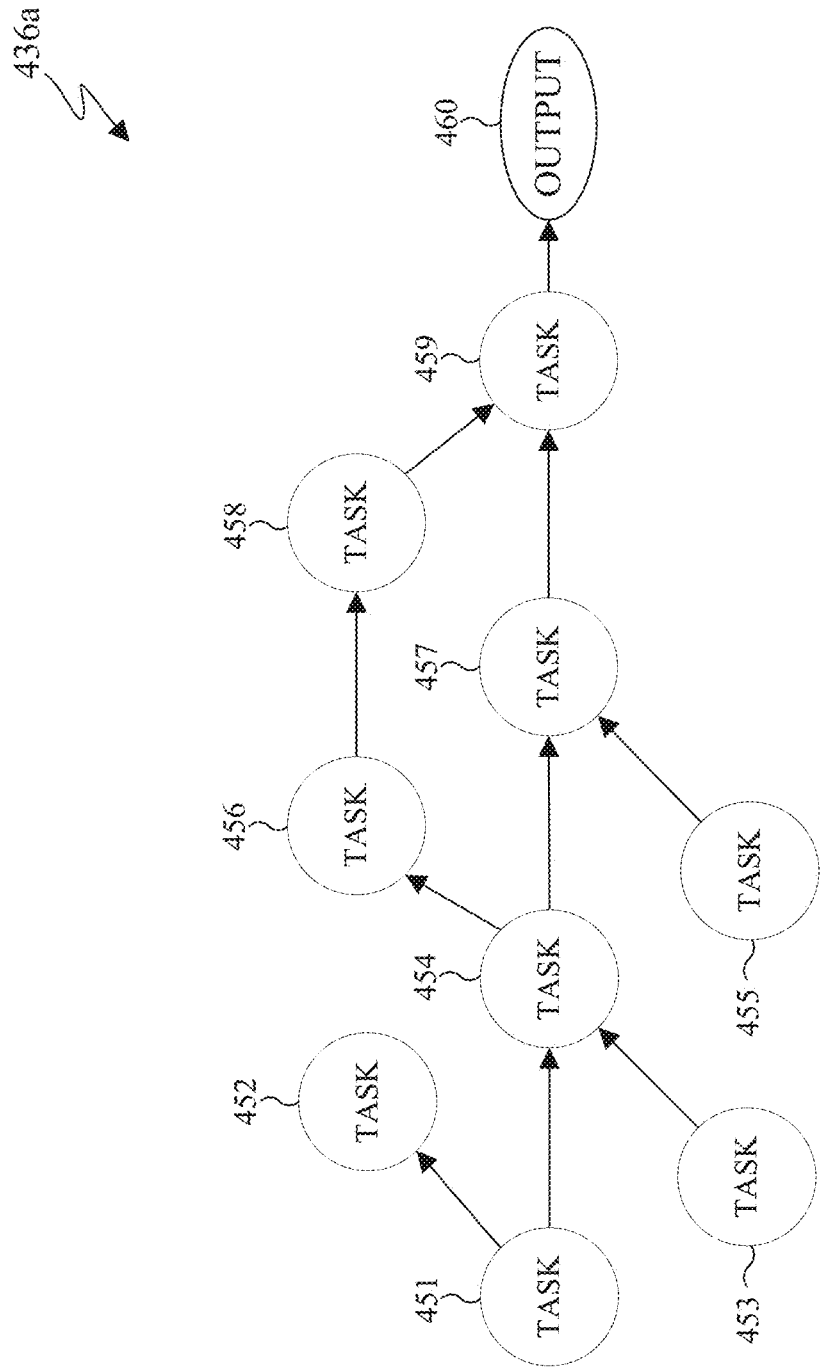
FIG. 4B illustrates an example workflow in accordance with an embodiment of this disclosure.
Figure 4C:
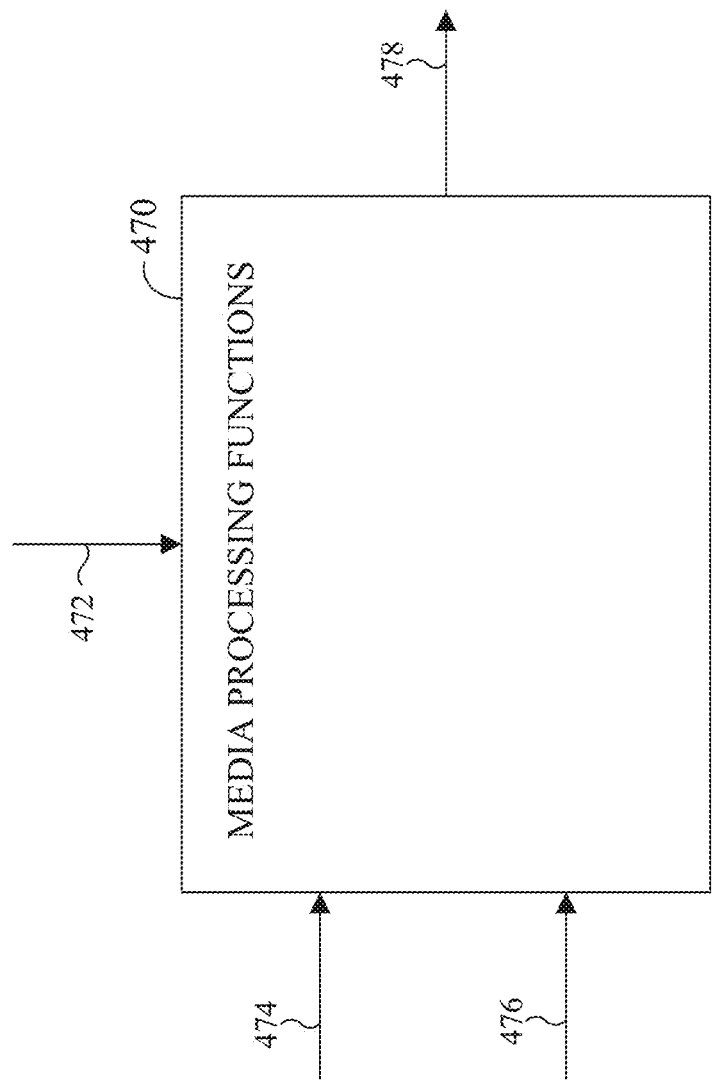
FIG. 4C illustrates an example media processing function in accordance with an embodiment of this disclosure.
Figure 4D:
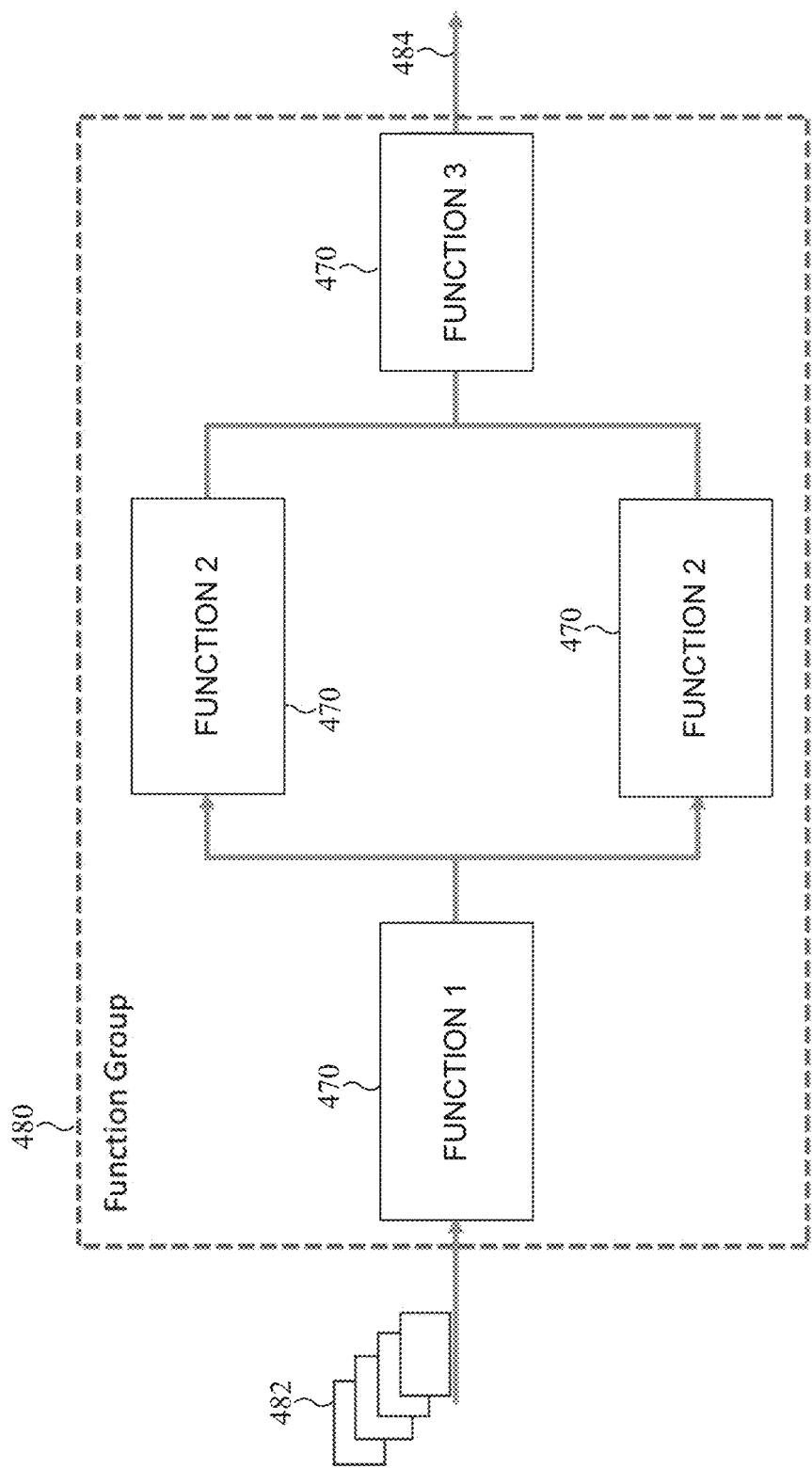
FIG. 4D illustrates a function group in accordance with an embodiment of this disclosure.

FIG. 4A illustrates a block diagram of an example network media processing system 400 in accordance with an embodiment of this disclosure. FIG. 4B illustrates and example workflow 436a in accordance with an embodiment of this disclosure. FIG. 4C illustrates an example media processing function 470 in accordance with an embodiment of this disclosure. FIG. 4D illustrates a function group 480 in accordance with an embodiment of this disclosure. The embodiments of FIGS. 4A-4D are for illustration only. Other embodiments can be used without departing from the scope of this disclosure.

As shown in FIG. 4A, the network media processing system 400 includes a media source 420, a server 430 and a media sink 440 in communication over a network 410. The network 410 can be the same as or similar to the network 102 of FIG. 1. In some embodiments, the network 410 represents a "cloud" of computers interconnected by one or more networks, where the network is a computing system utilizing clustered computers and components that act as a single pool of seamless resources when accessed. Also, in some embodiments, the network 410 is connected with one or more servers (such as the server 104 of FIG. 1, the server 200, and the server 430), one or more electronic devices (such as the client devices 106-114 of FIG. 1, the electronic device 300, and the media source 420). Further, in some embodiments, the network 410 can be connected to an information repository (such as the media sink 440, and database), that contains a look-up tables and information pertaining to various functions as well as a repository of published media.

In some embodiments, the media source 420 and the media sink 440 can represent one of the client devices 106-114 of FIG. 1, the electronic device 300 of FIG. 3, or other suitable device. In other embodiments, a portion of the components included in the media source 420 and the media sink 440 can be included in different devices, such as the server 430, multiple servers 104 or 200, multiple client devices 106-114, or other combination of different devices. In some embodiments, the media source 420 and the media sink 440 are the same device.

In this example, the media source 420 includes an information repository 422. Similarly the media sink 440 can includes an information repository 442. The media source 420 can include a camera or additional components that can capture or receive media. In some embodiments, the captured or recorded media requires a certain type of processing such as VR stitching, but lacks the processing capabilities to perform the necessary processing of the media content. The media sink 440 represents a storage device that the processed media can be delivered after processing by the server 430.

The information repository 422 and 442 represent any suitable structure(s) capable of storing and facilitating retrieval of information (such as data, program code, or other suitable information on a temporary or permanent basis). The information repository 422 and 442 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc. The information repositories 422 and 442 can include one or more media content such as the media content 363 of FIG. 3.

The media source 420 can include a user interface that enables a user to select media content to be offloaded from the information repository 422 to the server 430 for processing. The user interface can also enable the user to provide instructions to the server 430 as to what type of media processing is to be performed with respect to the media content. The media source 420 can offload media content for processing on the server 430. The server 430 can perform a network based media processing workflow by creating as a workflow 436 of media processing functions (or tasks) for a received media processing request. For example, a media source, such as the media source 420, sends a workflow description to the server 430. The workflow description provides a description of the input. For example, if the input is based on recordings from multiple cameras, the input description can include the number of cameras that recorded the content, the relative position of the cameras with respect to each other, the format the content was captured, and the like. The workflow description can also include a request for the intended media processing. Additionally, the workflow description can include a location (such as the media sink 440) the media content is to be moved to after the processing, such as an expected distribution output post processing.

After the server 430 receives the workflow description from the media source 420, the server 430 identifies one or more functions, entities, tasks, services, and the like to perform the media processing based on the workflow description and information associated with each of the functions.

In some embodiments, the server 430 can be implemented as shown in FIG. 2. In other embodiments, a portion of the components included in the server 430 can be included in different devices, such as multiple servers 104 or 200, multiple client devices 106-114, multiple electronic devices 300, or a combination of different devices. The server 430 can represent one or more local servers, one or more remote servers, a network based media processing (NBMP) framework, or the like. The server 430 can be a web server, a server computer such as a management server, or any other electronic computing system capable of sending and receiving data. The server 430 can include a function repository 432, a workflow manager 434, and a workflow 436.

The function repository 432 can be the same as or similar to the information repositories 422 and 442. The function repository 432 represents any suitable structure(s) capable of storing and facilitating retrieval of functions. The function repository 432 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc.

The function repository 432 can include multiple network based media processing functions, such as the media processing function 470 (the function 470) of FIG. 4C. In some embodiments, network based media processing functions, such as the function 470, are located on a remote server. The function 470 represents a network based media processing function, a network based media processing task, a network based media processing service, a network based media processing entity or the like. The function 470 is a task or node of the workflow 436a of FIG. 4B.

The function 470 can implement one media processing function or task. When multiple functions are arranged in a workflow pipeline, with each function performing a certain processing task, a workflow such as the workflow 436 and the workflow 436a of FIG. 4B are created. Each of the network based media processing functions when included in a workflow pipeline performs their corresponding tasks in order to complete the requested task from the media source 420. Each function 470 in the function repository 432 can be defined using a set of descriptors. Examples of descriptors for defining a function 470 are shown in the following table.

| Descriptor | Details |
| --- | --- |
| Detail Descriptor | Provides function details. Such information includes: ID: Represents Unique Function ID. Name: Represents Function Name. Type: Represents Function Name. Input Ports: Set of input ports which define different input data that the function needs for execution. Output Ports: Set of output ports which define different output data that the function can generate. |
| Input Descriptor | Provides input parameters for the function. Such information includes: Media Parameters: Provides media parameter information for the function. Such information includes a list of media description where each media description could include details such as: Media Stream ID: ID to identify media stream component. Bandwidth: Bandwidth of media stream. Codec Type: Type of codec. Media Type: Type of media. Clock Rate: Codec clock rate. Protocol: Protocol for delivery or access. Origination: Location where media will be sent from or the location for where the media can be fetched from. Such information may include: |

-continued

| Descriptor | Details |
|---|---|
| | Caching Server URL: URL location of caching server where the media is residing (e.g., edge cache).
External Server URL: Location of media at an external storage location.
Metadata Parameters: Provides metadata parameter information for the function. Such information includes a list of metadata descriptions where each metadata description includes details such as:
Metadata Stream ID: ID to identify metadata stream component.
Metadata Type: Type of metadata such as:
Timed Metadata: Description for timed metadata.
Non-timed metadata: Description of non-timed static metadata.
Bandwidth: Bandwidth of metadata stream.
Metadata Dictionary: Dictionary of static non-timed metadata. Dictionary contains a collection of key-value pairs. Each key represents the name of a static metadata parameter and the corresponding value indicates the value of that metadata parameter.
Protocol: Ingest protocol for timed metadata. Example: HTTP. When the workflow manager receives this information, the workflow manager can take the responsibility of returning back with the protocol endpoint information of the appropriate media processing entity to the media source so media source can ingest metadata using that protocol.
Metadata Ingest Format: Format of timed metadata. Example: JSON, XML.
Other Data Parameters: Provides information about other parameters that the function needs.
URL: URL to an external document that describes the complete input description for the function. |
| Output Descriptor | Provides output parameters for the function. Such information includes:
Media Parameters: Provides output media parameter information for the function. Such information includes a list of media description where each media description could include details such as:
Media Stream ID: ID to identify media stream component.
Bandwidth: Bandwidth of media stream.
Codec Type: Type of codec.
Media Type: Type of media.
Clock Rate: Codec clock rate.
Transport Protocol: Protocol for delivery of media type.
Destination: Where to send the media output to.
Merge Input Media Components: List of input media content components to merge to generate this media stream.
Distribution Format: Desired distribution format.
Metadata Parameters: Provides metadata parameter information for the function. Such information includes a list of metadata descriptions where each metadata description includes details such as:
Metadata Stream ID: ID to identify metadata stream component
Metadata Type: Type of metadata such as:
Timed Metadata: Description for timed metadata.
Non-timed metadata: Description of non-timed static metadata.
Merge Input Metadata Components: List of input metadata content components to merge to generate this metadata stream.
Distribution Format: Desired distribution format.
Other Data Parameters: Provides information about other parameters that the function needs.
URL: URL to an external document that describes the complete output description for the function.
Distribution Format: Desired output distribution format. |
| Processing Descriptor | Provides processing information about the function. Such information includes:
URL: Pointer to a document specifying function implementation. |
| Requirements Descriptor | Provides requirements for the function. Such information includes:
QoS Requirements: Provides QoS requirements for the function. Such information includes:
Delay: Provides delay requirements for function.
Bitrate: Provides bitrate requirements for the function. Such information includes the ingestion bit rate requirements that specifies bit rate requirements for content ingestion, and distribution bit rate requirements that specifies bit rate requirements for content distribution.
Throughput: Provides throughput requirements for the function.
Processing Requirements: Provides processing requirements for the function. Such information includes:
Hardware requirements: Provides hardware requirements such as processor requirements (minimum processor capabilities required), CPU cores (minimum number of CPU cores to be allocated), GPUs(minimum number if GPUs to be allocated), whether GPU acceleration is required. |

-continued

| Descriptor | Details |
| --- | --- |
| | Storage requirements: Provides storage requirements for compute infrastructure allocated for running the function. Such details include local storage requirements (minimum local storage to be allocated), aggregate storage requirements (total storage from local, network, and remote).<br>Deployment requirements.<br>Security Requirements: Provides security requirements such as whether Transport Layer Security (TLS) and secure shell (SSH) tunneling need to be enabled |
| Configuration Descriptor | Provides configuration information for the function. Such information includes:<br>Parameter configuration: Configuration details of variables, constants, and parameters required by the function. |
| Client Assistance Descriptor | Provides client assistance information that the function can take into consideration. Such information includes:<br>Device capabilities: Specifies device capabilities the function can take into consideration.<br>User preferences: Specifies user preferences the function can take into consideration. |
| Monitoring Descriptor | Provides information for allowed monitoring. Such information includes:<br>Variable Monitoring: Provides variable monitoring information for function variables. |
| Assertion Descriptor | Provides information for assertions that can be checked. Such information includes:<br>Assertion Dictionary: Dictionary of assertions where the key value represents the parameter that needs to be checked and the value of the dictionary represents on object which constitutes information of a) value for parameter to be checked with and b) operation during assertion check. |

All media processing functions, such as the function 470, are configured individually by the workflow manager 434. In order for the function 470 to perform a task within a workflow, the function 470 receives requirements 472, input media (or metadata or both) 474, and configuration information 476. The function 470 then produces an output 478 based on the received inputs (requirements 472, input data 474, and the configuration information 476).

A media processing function or task (such as the function 470) can receive an input data 474, such as a media data streams, metadata, or both. The function 470 can process the received media data streams and metadata. The function 470 produces the output 478 such as an output media, metadata, or both. The server 430 can use multiple media processing functions of different types to perform the requested processing of the media content. In some embodiments, the network based media processing functions can be created by a third party service provider and included in the directory.

The function repository 432 can also include a directory or list of functions including network based media processing functions, network based media processing tasks, network based media processing services, and the like, which are available to the workflow manager 434. The list of functions can also be located remotely from the server 430, such as in a remote database. The directory includes details of each media processing function accessible to the workflow manager 434. The directory can list the details concerning each of the media processing functions, such as (i) task details, (ii) inputs (such as the requirements 472, input data 474, and the configuration information 476 of the function 470 of FIG. 4C), and (iii) outputs (such as the output 478 of the function 470 of FIG. 4C).

As shown in FIG. 4A, the workflow description, which provides information for media processing, is sent from the NBMP source 420 to the workflow manager 434, which the workflow manager 434 uses to select a set of MPEs and run media processing tasks in them. The tasks to be run in the MPE are chosen from a function repository 432. The workflow manager 434 then runs the selected tasks in one or more media processing entities; configures the tasks; and connects control and data plane paths between the NBMP source 420, the provisioned MPEs, and the media sink 440. The workflow can be shown as a directed acyclic graph (DAG) as shown in FIGS. 4B-4D.

The "input data" is represented as the input data 474 to the function 470. The input data is the media content, metadata, or a portion of the media content that the particular function is to act on. For example, "input data" can specify a format type of the data, such as a specific format of the data. The type of data can be the actual input data stream or a metadata stream. That is, the input data represents the data that the function uses or manipulates. In some embodiments, the input data can be an input description that provides information describing the type of input for the particular function.

The "configuration data" is represented as the configuration information 476 of the function 470 of FIG. 4C. The "configuration data" provides configuration information to the function so that the function can initialize its processing parameters with respect to the "input data." For example, the "configuration data" can provide information that is needed for executing the assigned processing for the function. The "configuration data" can include configuration variables, constants, and parameters required by the executable/script assigned to the particular function. The "configuration data" can also include the configuration type of output that the function is to create. The "configuration data" can also include the number of cameras and orientation of each camera when recording the media.

The "configuration data" is represented as the configuration information 476 of the function 470 of FIG. 4C. The "configuration data" provides configuration information to the function so that the function can initialize its processing parameters with respect to the "input data." For example, the "configuration data" can provide information that is needed for executing the assigned processing for the function. The "configuration data" can include configuration variables, constants, and parameters required by the executable/script assigned to the particular function. The "configuration data" can also include the configuration type of output that the function is to create. The "configuration data" can also include the number of cameras and orientation of each camera when recording the medial. For example, if the recorded media is captured by four cameras, the "configuration data" can include the orientation of each camera such as the location of each camera relative to the other three cameras, the configuration parameters of the cameras, such as the depth of focus, the number of megapixels, lighting conditions, resolution, and the like.

The "requirements" is represented as the requirements 472 of the function 470 of FIG. 4C. The "requirements" provides one or more requirements and pre-condition information to determine where the function should be located and how it is selected by the workflow manager 434. For example, the "requirements" can include QoS information such as delay requirements such as delay requirements, bandwidth requirements, and the like. The "requirements" can also include processing requirements such as compute requirements, storage requirements, infrastructure requirements, and the like that are needed by the particular function in order to perform the required processing. For instance, the processing requirements can indicate particular hardware that the function uses such as a particular processor, such as the number of processors required, by the function the speed of the processors required by the function, the minimum or maximum memory requirements required by the function, the delay or latency for the function to perform its task, and the like.

The workflow manager 434 can receive the workflow description from the media source 420. The workflow manager 434 can search through all of the available functions and services within the directory (such as the directory within the function repository 432). Based on the information of each function that is included in the directory, the workflow manager 434 inspects requirements of the functions and elects one or more network based media processing functions to build the workflow 436. An example workflow 436a is illustrated below in FIG. 4B. The workflow manager 434 selects and maps each of the media processing functions to create a pipeline the workflow 436.

For example, once the network operator or third party service provider defines the multiple functions that are represented in the directory, the server 430 can receive a request for media processing. The workflow manager 434 can receive a media processing request from the media source 420. The request for media processing can include a particular input of media data, a requested media output of the processing as well as certain processing requirements such as delays and the like. In some embodiments, the media source 420 represents multiple electronic devices, each of which can sent media processing requests to the server 430.

When a request for media processing is received from the media source 420, the workflow manager 434 scans the directory that includes all of the available services and functions. In response to receiving the request, the workflow manager 434 inspects the specified requirements for each function, service, task, and the like that are included in the directory. For example, based on the request and functions within the directory, the workflow manager 434 reviews each functions details, inputs, output (see inputs of Table (1) above) when selecting each function.

The workflow manager 434 selects certain functions from the directory which are able to perform the processing. The workflow manager 434 uses selected functions to build the media processing pipeline, such as the workflow 436. For example, the workflow manager 434 can select each subsequent function of the workflow 436 based on the output of the previous function, until the requested end result is able to be accomplished. Such that the output of a first function is the input of a second function, the output of the second function is the input of a third function, and so-on until the requested processing is complete. In some embodiments, the workflow 436 is not linear such as the workflow 436a as illustrated in FIG. 4B. In some embodiments, the workflow manager 434 can instruct certain functions to produce multiple outputs such that the output is sent to a corresponding number of subsequent functions. The workflow manager 434 also selects particular functions based on the processing requirement included in the request. Thereafter, the workflow manager 434 organizes each selected function in a pipeline, such as the workflow 436 to perform the media processing.

The workflow manager 434 can also selects certain functions based on the overall latency of each individual function. For example, if the workflow is to be complete within a certain time duration (as indicated in the received workflow description), the workflow manager 434 selects certain functions that can perform the entire workflow within the allotted end-to-end latency as indicated in the received workflow description. The workflow manager 434 can also select certain functions based on a maximum or minim allowed frame rate, process speed, and the like.

As detailed above each function includes certain requirements in order to execute appropriately. The requirements can include a number of CPUs, a number of GPUs, a memory requirement, a bandwidth requirement and the like. When the workflow manager 434 selects certain functions, the workflow manager 434 inspects the requirements of each function and selects functions based on the system parameters to ensure that each function has the necessary requirements to perform its respective processing task.

The workflow manager 434 maps the source request to appropriate media processing functions in the workflow 436 based on each functions pre-defined requirements. The workflow manager 434 then maps the source request to each function in the workflow 436 based on the functions services defined the in the requirements of each function (as shown in Table (1) above).

The workflow manager 434 can monitor each individual function as each function performs its processing of the media. Monitoring each function can include identifying if a function fails while performing its task. Monitoring each function can also include identifying if the function can requires a different input format than indicated in the directory or produce a different output than indicated in the directory. If the workflow manager 434 identifies that a function fails, the workflow manager 434 can select one or more new functions to replace the failed function in the workflow 436. Similarly, if the workflow manager 434 identifies that the input or output of a function is incorrect to perform the intended workflow, then the workflow manager 434 can remove the incorrect function, and replace it with one or more new functions. Alternatively, the workflow manager 434 can select one or more additional functions from the directory that changes the format of the input or output of a function in order that the workflow of the workflow 436 processes the media content.

The workflow 436 represents a workflow pipeline with any number of selected functions that are mapped in a certain order to perform the processing request. In some embodiments, the workflow 436 can be linear workflow such that the output of each function is the input to the next subsequent function, until the processing is complete. In some embodiments, the workflow 436 represents a workflow that is not linear as shown in in the workflow 436a of FIG. 4B. In some embodiments, the functions in a workflow pipeline can occur in series, while other functions occur in parallel (at the same or similar time).

In some embodiments, an end user can select and organize the individual functions into a workflow pipeline and allow customers the customers of the end user to use the created functions 470 appear together for many of the media processing functionalities. To address this case, a function group 480 is defined and represented as such in the function repository 432.

To define function groups in the function repository, the present disclosure provides a method in which the function repository holds a separate table or markup representing the grouping of different functions of one the group. In an embodiment of the present disclosure, the table or the markup is of the following format:

| Group Id | Group Name | Membership | Description | Schematic representation |
|---|---|---|---|---|
| Group_1_Id | Group_1_Name | seq{<func_1_Id>, <func_2_Id>, <func_3_Id>} | Three functions 470 represented by their Ids func_1_Id, func_2_Id, func_3_Id are grouped to form a function group 480 (called Group_1_Name) and the three functions are inserted in a sequence (as defined using keyword "seq" in Membership column) into a NBMP workflow | f1 → f2 → f3 |
| Group_2_Id | Group_2_Name | par{<func_4_Id><func_5_Id>} | Two functions 470 represented by their Ids func_4_Id, func_5_Id are grouped to form a function group 480 (called Group_2_Name) and the two functions 470 are inserted in parallel (as defined using keyword "par" in Membership column) as a function group 480 into a NBMP workflow 436. | f4 / f5 |
| Group_2_Id | Group_2_Name | seq{<func_1_Id>, par{<func_3_Id><func_4_Id>}, <func_2_Id>}} | Function group 480 with two functions 470 func_3_Id and func_4_Id are inserted in parallel. This parallel function group 480 is run in a sequence with func_1_Id and func_2_Id. | f1 → (f3, f4) → f2 | function. In some embodiments, a user can access the workflow manager 434 and request the workflow manager 434 to create a workflow pipeline based on the requested processing task and input data.

FIG. 4D illustrates an example function group 480 in accordance with an embodiment of the present disclosure. The set of media processing functions 470 that can be inserted into media workflows can be managed inside a repository called the function repository 432. The network service provider can manage this function repository so the workflow manager or the NBMP (media) source 420 can lookup available media processing functions 470, and then make a decision to run the functions 470 as media processing tasks on processing entities allocated for the workflow 436.

In a network media processing system 400, it is possible that one or more functions 470 need to be executed very frequently, i.e. the functions 470 are applied together in the same order in many of the NBMP workflows 436. This can happen because: (1) one or more functions 470 need to be applied before or after another function 470 to make either the input 482 or output 484 respectively compatible with previous or next functions in the workflow 436; (2) a split of a given processing functionality happens when a media processing functionality needs to be implemented using multiple media processing functions 470; or (3) The processing requirements cannot be satisfied by a single function 470 and have to be distributed over multiple parallel instances of the function 470 of which the output has to be multiplexed. In any case, it is quite common that a set of Functions 470 can be grouped together in a function group 480 using the "seq" and "par" keywords as described above. When such function groups 480 are created in the function repository 432, the responsibility of the function developer is to make sure that the output ports of a function 470 can be connected to the input ports of the next function 470 in the function group 480, i.e. the functions 470 that are compatible with each other. However, if the two functions 470 that need to be grouped together are not compatible with each other (i.e., output ports of a function 470 cannot be connected to input ports of another function 470), then the workflow manager 434 can insert one or more "compatibility functions" to connect those incompatible functions in a function group 480.

With the above type of group information in a separate table/database, the grouping information is held separately from the function definition, and as a result the functions are not closely tied to a function group 480, i.e. functions 470 defined in a function group 480 can also be used without other functions 470 in the function group 480 if required in a different workflow.

For the above table or database to be maintained in the function repository 432, the entities or individuals who request registration of functions 470 inside an operator's function repository 432 should build appropriate function definitions using the representation of function definition using different descriptors described above. Also, the workflow manager 434 can construct this table based on function descriptors in the function repository 432. This will be helpful when the functions 470 are registered by different vendors and had not prior intention of grouping their functions 470 with other functions 470 defined by a different vendor.

In certain embodiments, as an alternative to maintaining a separate function group table/database, each function 470 can express its group intentions using a "Group Descriptor".

connections to other functions 470 of the function group 480, number of instances of the function 470 to load in the function group 480, the function's 470 position in the sub-workflow that represents the function group 480. The information can be provided according to the following table.

| | | |
|---|---|---|
| standalone | Boolean | True: means the function 470 can run independently without necessarily belonging to group, but the function 470 may be instantiated as part of a group. |
| | | False: means the Function must run as a part of a group. |
| Groups | list | List of group structures that this function may be instantiated to be part of. |
| GROUP | | |
| connectivity | list | function id of the function that is a connection and port id of the port on which the connection is established. |
| positions | index of | |
| instantiations | range | number of instances of this function that may be used in this group. |
| restrictions | list | input, configuration, and output parameter restrictions required by this group. |

The Group Descriptor provides the grouping information of that function 470 with respect to other functions 470 in the function repository 432. This Group Descriptor is included in addition to other descriptors as described earlier while providing a function definition for insertion into the function repository. The Group Descriptor provides grouping information using the "seq" and "par" as described earlier, along with a new keyword "self" as described below. For example, in function definition of func_2 (whose Id is func_d), the Group Descriptor can be shown using following examples.

Example 1 func_2 in a sequence: Func_2 Group Descriptor: seq{<func_1_Id>,self, <func_3_Id>}, represents that func_2 (as represented using "self" keyword) is executed in sequence with func_1_Id and func_3_Id in order of sequence shown above.

Example 2 func_2 in parallel: Func_2 Group Descriptor: par{<func_1_Id>,self}, represents that func_2 (as represented using "self" keyword) is executed in parallel with func_1_Id in the group.

Example 3 func_2 in a parallel subgroup, but in sequence in a parent group: Func_2 Group Descriptor: seq{func_1_Id, par{<func_3_Id>,self}, func_4_Id} represents that func_2 (as represented using "self" keyword) is executed in parallel with func_1_Id in the sub group. And this sub group is executed in a sequence with functions func_1_Id and func_4_Id using the order shown by the grouping.

With these types of representation grouping of functions need to be performed during a function's definition registration in the function repository 432.

In certain embodiments, a function 470 is able to indicate a list of function groups 480 that the function 470 may or must belong to. A flag is used to indicate whether grouping is essential or optional. The function 470 also shows its In order to maintain synchronization of the media across the functions 470 of the same function group 480, an additional metadata connection between the functions 470 is used. A synchronization signal is generated by the first function 470 in the function group 480 and sent as a separate metadata stream. The information is propagated to the last function 470 in the function group 480, which can use this information to re-multiplex and re-sync the output of prior functions 470 in the function group 480.

It is possible that when a function group 480 is created, one or more of the functions 470 within the function group 480 depend upon execution result of functions 470 that appeared earlier in the function group 480. In this context, it becomes possible that functions 470 within the function group 480 not only exchange inputs and outputs, but also other data such as the configuration data and requirements data. One or more functions 470 in the function group 480 that appear early in the function group 480 can generate configuration data that the next functions 470 in the function group 480 might need for their execution. For this to be enabled, (1) functions 470 can generate and output configuration data that is sent as input to functions 470 that appear later in the function group 480; (2) functions 470 can generate and output requirement data that is sent as input to functions 470 that appear later in the function group 480; (3) functions 470 can generate and output monitoring data (e.g., quality monitoring data, security monitoring data etc.) that is sent as input to functions 470 that appear later in the function group 480; and (4) functions 470 can generate and output assertion data (data that represents different checks that need to be performed) that is sent as input to functions 470 that appear later in the function group 480.

Such data, for the benefit of functions 470 that appear later in the function group, can be generated and sent by the functions that appear earlier in the group. This data can be sent using the following two options. (1) Returning the data to the workflow manager 434, which the workflow manager 434 can use to configure other functions 470 within the function group 480. Typically static data can be sent to subsequent functions 470 within the function group 480 through the workflow manager 434. (2) For dynamic data that is generated by the functions 470 earlier in the function group 480, existing media and metadata channels can be used to send that information directly to the entities running subsequent functions within the function group 480.

As described in the NBMP system 400, a workflow description document is sent from the NBMP (media) source 420 for requesting set up of media processing in the network. The workflow description document may contain the list of functions that the NBMP source 420 intends to include in the NBMP workflow. With function groups in the function repository, the NBMP source 420 is able to insert function groups 480 in the workflow description document in addition to functions 470 in the function repository 432.

The NBMP source 420 can insert function groups 480 in an NBMP workflow 436 using two different ways. (1) The NBMP source 420 can indicate a list of keywords based on which the workflow manager 434 can identify a function group 480 that is inserted in the workflow 436. The workflow manager 434 can use the list of keywords to (a) can individually apply different keywords to search for functions 470 that match one or more of the keywords given by the NBMP source 420. The workflow manager 434 can then group different functions 470 that match the multiple sets of keywords into a function group 480; and (b) can decide on a function group 480 using relationships between different keywords given by the NBMP source 420. (2) The NBMP source 420 can indicate usage of a specific function group 480 in the function repository 432 by including the specific function group 480 in the workflow description document that the NBMP source 420 sends to the workflow manager 434. This option is preferred when the NBMP source 420 indicates the list of all media processing functions 470 that the NBMP 420 wants to be inserted in the workflow description document (i.e. source defined workflows). In this case, similar to a way where the NBMP source 420 indicates the list of functions 470 (e.g., using task connection map i.e. map of interconnecting tasks), the NBMP source 420 can include any function group 480 in place of a function 470 in the task connection map.

Different functions within a group may have clear dependencies with other functions in the group. The dependency information can be encoded using a set of keywords in the function repository as described below.

different vendors i.e. different implementers. With this setup, it is entirely possible that a vendor might provide a function for a required functionality and a different vendor might provide a function group implementation for the same functionality. When these two types of implementations are available, it becomes the responsibility of the workflow manager to choose one implementation for a given request from the NBMP source.

When such multiple options are available in the function repository, it is proposed that the workflow manager treat this as a classification problem and use machine learning algorithms to choose the correct implementation to insert into the NBMP workflow. When the NBMP source clearly indicates the function or function group in the workflow description document, the workflow manager just includes the respective function or function group in the NBMP workflow. In this case, the workflow manager need not use the inference from classification model to find the correct implementation to insert in the workflow. However, when there is no indication from the NBMP source on the type of implementation to be included in the workflow (e.g., when NBMP source just sends keywords for choosing functions or function groups), then it is proposed that the workflow manager use the inferences it has derived using the learning algorithms that it runs to choose the correct implementation.

Choosing the correct implementation (e.g. whether to insert a function or function group, or which implementation among a varied set of implementations can be done as following: (1) Collect different implementations and treat each of them as a classification option i.e. an outcome. (2) Depending on a number of input variables, find which outcome (implementation) is more probable/feasible. This can be done using a number of classification models such as logistic regression, decision tree, random forest, gradient-boosted tree, multilayer perception, one-vs-rest, and Naïve Bayes. Using any of the algorithms listed above, a number of input factors can be used for learning to find the correct outcome. The different input factors that the above algorithms can consider to choose the correct outcome (imple-

| Keyword | Description | Example: |
|---|---|---|
| parent-of | Indicates that a function is a parent of another function in the group i.e. the parent function needs to be executed in the group before executing this function | parent-of(func_2_Id) = func_1_Id tells that function with Id func_1_Id need to be executed first before executing function with Id func_2_Id. This is similar to seq{func_1_Id, func_2_Id} as described in main embodiment |
| child-of | Indicates that a function is a child of another function in the group i.e. this function needs to be executed in the group only after the parent function is executed | child-of(func_1_Id) = func_2_Id tells that function with Id func_1_Id need to be executed first before executing function with Id func_2_Id. This is similar to seq{func_1_Id, func_2_Id} as described in main embodiment |
| sibling-of | Indicates that a function needs to be executed simultaneously with other function | sibling-of(func_2_Id) = func_1_Id tells that function with Ids func_1_Id and func_2_Id need to be executed in parallel. This is similar to par{func_1_Id, func_2_Id} as described in main embodiment |

The function dependency information as shown above can be registered with the function repository while registering the function definition information. For example, this information can be registered using the Group Descriptor. The workflow manager will build group relationships based on this information.

As the function repository is maintained by the NBMP operator, it is entirely possible that the implementation of different functions in the function repository comes from mentation) are: (a) NBMP source preferences such as requested function/function groups requested by the NBMP source. (b) Requirements passed by the NBMP source in the workflow description document. A number of input factors can be based on requirements information as listed below: (i) Bit rate requirements: Choosing an outcome based on requested bit rate. (ii) Throughput requirements: Choosing an outcome based on requested throughput. (iii) Hardware requirements: Choosing an outcome based on type of hardware requirements provided by the NBMP source such as the processor requirements, CPU cores, GPUs etc. (iv) Storage requirements: Choosing an outcome based on storage. (v) Security requirements: Choosing an outcome based on security requirements. (C) Operator preferences in choosing the correct implementation.

Based on a number of input factors as defined above, the workflow manager can classify a likely outcome that represents a given implementation (e.g., a function or a function group). The outcome represents the implementation of a functionality that the workflow manager inserts into the NBMP workflow.

FIG. 4B illustrates a workflow pipeline with multiple tasks, tasks 451-459. Each task represents a function, similar to the function 470, of FIG. 4C. The workflow manager 434 selects each of the tasks 451-459 in order to generate the output 460 based on a received workflow description from the media source 420. Task 451, 453, and 455 can receive the input data, or a portion of the input data. In some embodiments, a function can receive multiple inputs such as the tasks 454 and 457. In some embodiments, a function can generate multiple outputs, such as the task 451 and 454. In some embodiments, functions can process data in parallel such as the tasks 454, 457, 459, 456, and 458.

Although FIG. 4A illustrate the environment-architecture, FIG. 4B illustrates an example workflow, FIG. 4C illustrates an example function, and FIG. 4D illustrates an example function group. Various changes can be made to FIGS. 4A-4D. For example, any number of functions can be included in the workflow 436.

Figure 5:
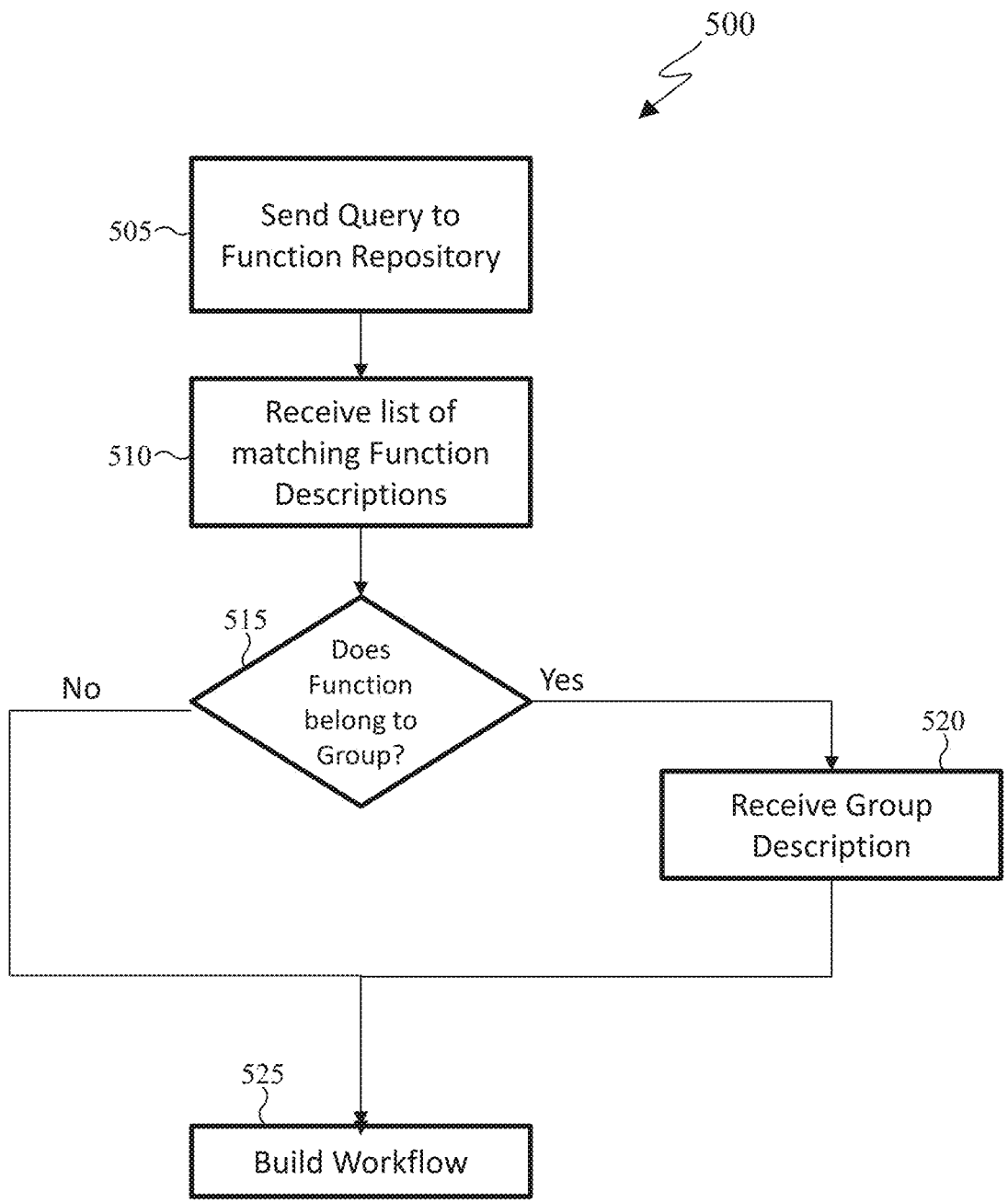
FIG. 5 illustrates an example method for workflow generation with function groups in accordance with an embodiment of this disclosure.

FIG. 5 illustrates an example method 500 for workflow generation with function groups in accordance with an embodiment of this disclosure.

In operation 505, the workflow manager 434 can send a query to a function repository 432. The query can include inputs, outputs, functionality, etc. of the function 470. The function repository 432 can traverse a list of the stored functions 470 to determine one or more functions that include the requested inputs, outputs, or functionality.

In operation 510, the workflow manager 434 can receive a list of matching function descriptions. The function descriptions can include the inputs, outputs, and functionality found through the traversal of the function repository 432.

In operation 515, the workflow manager 434 can determine if a suitable function 470 belongs to a function group 480. The workflow manager 434 performs the determination for each function 470 in the list of matching function descriptions.

In operation 520, the workflow manager 434 can receive one or more function group descriptions. When a function 470 is part of a function group, the workflow manager 434 requests the function group description from the function repository.

In operation 525, the workflow manager 434 can build the workflow 436. The functions 470 and function groups 480 can be added to the workflow 436 based on the function descriptions and the function group descriptions.

Figure 6:
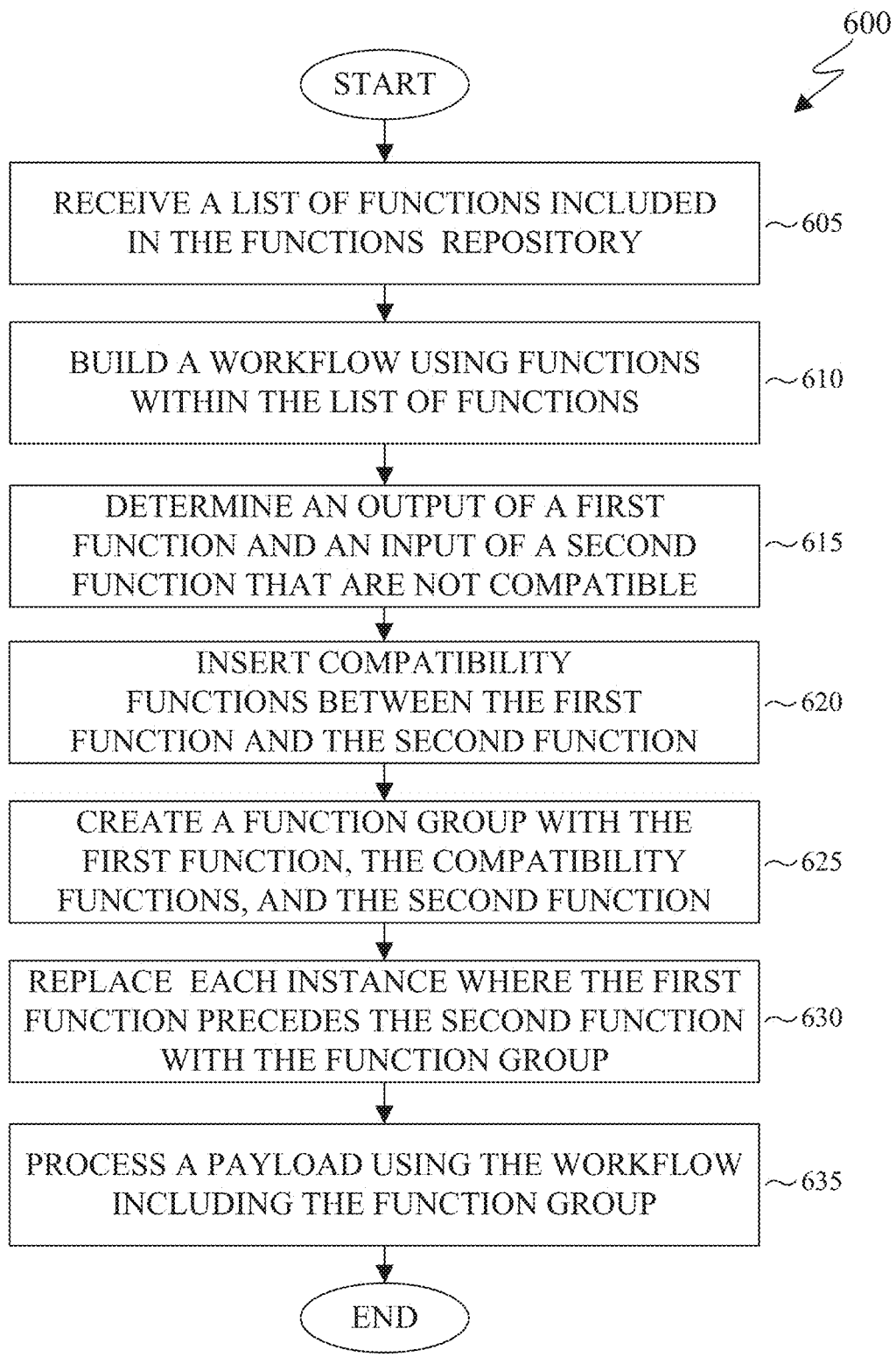
FIG. 6 illustrates an example method for management of network based media processing functions in accordance with an embodiment of this disclosure.

FIG. 6 illustrates an example method for management of network based media processing functions in accordance with an embodiment of this disclosure. For example, the process depicted in FIG. 13 is described as implemented by the server 200 of FIG. 2, the electronic device 300 of FIG. 3, the media source 420 and the server 430 of FIG. 4A.

In operation 605, the server 430 can receive a list of functions included in the functions repository. The list of functions can be received in response to a query from a media source. The list of functions can include function descriptions, function inputs, function outputs, etc.

In operation 610, the server 430 can build a workflow using functions within the list of functions. The workflow 436 is generated based on requirements received from the media source in order to process a payload, such as a media file. The payload can be processed within a single entity or distributed amongst multiple entities. When building the workflow 436, the resources and capabilities of the entities are considered to maximize efficiencies and minimize costs.

In operation 615, the server 430 can determine an output of a first function and an input of a second function that are not compatible. When building a workflow, the server 430 can choose specific functions based on the function description. When optimizing the workflow, the server 430 can determine that certain functions, while optimal for the processing the payload, are not compatible with a prior function or following function. The determination of the compatibility can be based on an output of the first function and an input of the second function. The output of a function must be compatible with the output of the function immediately following.

In operation 620, the server 430 can insert one or more compatibility functions between the first function and the second function. The compatibility functions can be a transform to handle the output of the first function and the input of the second function. The one or more compatibility functions can have multiple functions that are used. When multiple compatibility functions are used, they can be placed in the workflow in series or parallel depending on the functionality of the compatibility functions.

In operation 625, the server 430 can create a function group with the first function, the one or more compatibility functions, and the second function. Once the compatibility functions are determined, the group of the first function, the one or more compatibility functions, and the second function can be grouped in a function group. The server 430 can provide a group description of the function group when saving in the function repository for future use or for replacing other instances of the first function and the second function in a workflow.

In operation 630, the server 430 can replace each instance where the first function immediately precedes the second function with the function group. For existing workflows or other instances of the first function preceding the second function, the server 430 can determine that the function group would enhance the workflow by replacing. The server 430 could also determine that functions with similar descriptions or purposes to the first function and the second function could operate better using the new function group.

In operation 635, the server can process a payload using the workflow including the function group. The server 430 directs the payload from the media source 420 based on the workflow 436 to process the payload for consumption by the media sink 440.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a memory; and
   a processor coupled to the memory, the processor configured to:
     receive, from a function repository, a list of functions included in the function repository;
     build a workflow using functions within the list of functions;
     determine an output of a first function and an input of a second function are not compatible;
     insert one or more compatibility functions between the output of the first function and the input of the second function;
     create a function group with the first function, the one or more compatibility functions, and the second function;
     replace each instance where the first function immediately precedes the second function with the function group; and
     process a payload using the workflow including the function group.

2. The electronic device of claim 1, wherein a function in the list of functions comprises a function description that includes:
   a standalone variable indicating the function can run independently,
   a group list indicating function groups that the function is included in,
   a group connectivity variable indicating a function ID of the function and a connection and port id of a port on which a connection is established within the function group,
   a position index indicating a position of the function within a group,
   an instantiations range indicating a number of instance the function may be used in the function group, and
   a restrictions list indicating input parameter restrictions, configuration parameter restrictions, and output parameter restrictions required by the function group.

3. The electronic device of claim 2, wherein each group in the function repository includes a group identification (ID), a group name, a group membership, a group description, and a group schematic representation.

4. The electronic device of claim 1, wherein the function group comprises a function dependencies list of how a function interacts with another function within the function group that includes:
   a parent-of function indicating the function is executed before the other function,
   a child-of function indicating the function is executed after the other function, and
   a sibling-of function indicating the function is executed simultaneously with the other function.

5. The electronic device of claim 1, wherein, when the function repository does not include one compatible function for compatibility of the output of the first function and the input of the second function, the processor is further configured to determine multiple functions to connect the first function and the second function.

6. The electronic device of claim 5, wherein the multiple functions operate in parallel to accomplish the compatibility of the function group.

7. The electronic device of claim 5, wherein the multiple functions operate in series to accomplish the compatibility of the function group.

8. A method for management of network based media processing function comprising:
   receiving, from a function repository, a list of functions included in the function repository;
   building a workflow using functions within the list of functions;
   determining an output of a first function and an input of a second function are not compatible;
   inserting one or more compatibility functions between the output of the first function and the input of the second function;
   creating a function group with the first function, the one or more compatibility functions, and the second function;
   replacing each instance where the first function immediately precedes the second function with the function group; and
   processing a payload using the workflow including the function group.

9. The method of claim 8, wherein a function in the list of functions comprises a function description that includes:
   a standalone variable indicating the function can run independently,
   a group list indicating function groups that the function is included in,
   a group connectivity variable indicating a function ID of the function and a connection and port id of a port on which a connection is established within the function group,
   a position index indicating a position of the function within a group,
   an instantiations range indicating a number of instance the function may be used in the function group, and
   a restrictions list indicating input parameter restrictions, configuration parameter restrictions, and output parameter restrictions required by the function group.

10. The method of claim 9, wherein each group in the function repository includes a group identification (ID), a group name, a group membership, a group description, and a group schematic representation.

11. The method of claim 8, wherein the function group comprises a function dependencies list of how a function interacts with another function within the function group that includes:
    a parent-of function indicating the function is executed before the other function,
    a child-of function indicating the function is executed after the other function, and
    a sibling-of function indicating the function is executed simultaneously with the other function.

12. The method of claim 8, further comprising, when the function repository does not include one compatible function for compatibility of the output of the first function and the input of the second function, determining multiple functions to connect the first function and the second function.

13. The method of claim 12, wherein the multiple functions operate in parallel to accomplish the compatibility of the function group.

14. The method of claim 12, wherein the multiple functions operate in series to accomplish the compatibility of the function group.

15. A non-transitory computer readable medium embodying a computer program, the computer program comprising computer readable program code that, when executed by a processor of an electronic device, causes the electronic device to:
receive, from a function repository, a list of functions included in the function repository;
build a workflow using functions within the list of functions;
determine an output of a first function and an input of a second function are not compatible;
insert one or more compatibility functions between the output of the first function and the input of the second function;
create a function group with the first function, the one or more compatibility functions, and the second function;
replace each instance where the first function immediately precedes the second function with the function group; and
process a payload using the workflow including the function group.

16. The non-transitory computer readable medium of claim 15, wherein a function in the list of functions comprises a function description that includes:
a standalone variable indicating the function can run independently,
a group list indicating function groups that the function is included in,
a group connectivity variable indicating a function ID of the function and a connection and port id of a port on which a connection is established within the function group,
a position index indicating a position of the function within a group,
an instantiations range indicating a number of instance the function may be used in the function group, and
a restrictions list indicating input parameter restrictions, configuration parameter restrictions, and output parameter restrictions required by the function group.

17. The non-transitory computer readable medium of claim 16, wherein each group in the function repository includes a group identification (ID), a group name, a group membership, a group description, and a group schematic representation.

18. The non-transitory computer readable medium of claim 15, wherein the function group comprises a function dependencies list of how a function interacts with another function within the function group that includes:
a parent-of function indicating the function is executed before the other function,
a child-of function indicating the function is executed after the other function, and
a sibling-of function indicating the function is executed simultaneously with the other function.

19. The non-transitory computer readable medium of claim 15, wherein, when the function repository does not include one compatible function for compatibility of the output of the first function and the input of the second function, the program code further causes the processor to determine multiple functions to connect the first function and the second function.

20. The non-transitory computer readable medium of claim 19, wherein the multiple functions operate in parallel to accomplish the compatibility of the function group.

* * * * *